United States Patent [19]

Larsen et al.

[11] 4,346,525
[45] Aug. 31, 1982

[54] CUSHION PAD FOR SPORT SHOES AND THE LIKE AND METHOD FOR FABRICATING SAME

[75] Inventors: John E. Larsen, Hingham; Rob Roy McGregor, Concord, both of Mass.

[73] Assignee: Colgate-Palmolive Company, New York, N.Y.

[21] Appl. No.: 91,706

[22] Filed: Nov. 6, 1979

Related U.S. Application Data

[63] Continuation of Ser. No. 861,153, Dec. 16, 1977, abandoned.

[51] Int. Cl.$^3$ ...................... A43B 23/08; A43B 21/32; A43B 19/00
[52] U.S. Cl. .......................................... 36/69; 36/37; 36/71; 128/586; 128/595
[58] Field of Search ................. 36/69, 71, 80, 37, 129; 128/586, 590, 595

[56] References Cited

U.S. PATENT DOCUMENTS

| | | | |
|---|---|---|---|
| 1,055,768 | 3/1913 | Levee et al. | 36/37 |
| 1,244,027 | 10/1917 | Calvey | 36/37 X |
| 2,348,300 | 5/1944 | Klaus | 128/595 |
| 2,403,442 | 7/1946 | Klaus | 36/37 X |
| 2,598,782 | 6/1952 | Gillis | 36/37 X |
| 2,924,849 | 2/1960 | Buchman | |
| 3,068,872 | 12/1962 | Brody | 128/595 |
| 3,309,797 | 3/1967 | Poitras | 36/80 |
| 3,333,353 | 8/1967 | Garcia | 36/69 X |
| 3,466,763 | 9/1969 | Levin | 36/69 X |
| 3,545,447 | 12/1970 | Silverman | 128/595 X |
| 3,616,170 | 10/1971 | Closson, Jr. | 36/69 X |

FOREIGN PATENT DOCUMENTS

| | | | |
|---|---|---|---|
| 2036062 | 2/1972 | Fed. Rep. of Germany | 36/129 |
| 447194 | 5/1936 | United Kingdom | 36/37 |

*Primary Examiner*—James Kee Chi

[57] ABSTRACT

There is disclosed a cushion pad for sport shoes and the like and a method for manufacturing such a pad and the combination of such a pad with a sport shoe and the like. The pad of the present invention is fabricated from a flat web of closed pore foam of cross-linked ethylene vinyl acetate-low density polyethylene copolymer. The pad is formed between two opposing molds to present a shape having a cup-like depression adapted and constructed to accept essentially the heel portion of a human being. The so-formed pad is then cut out of the remainder of the formed web in a manner whereby the pad provides support from just in back of the first metatarsal joint to the sides and back of the calcaneus. It has been found that the resultant pad made within the purivew of the invention requires only a few sizes to fit most of the feet of possible users.

18 Claims, 7 Drawing Figures

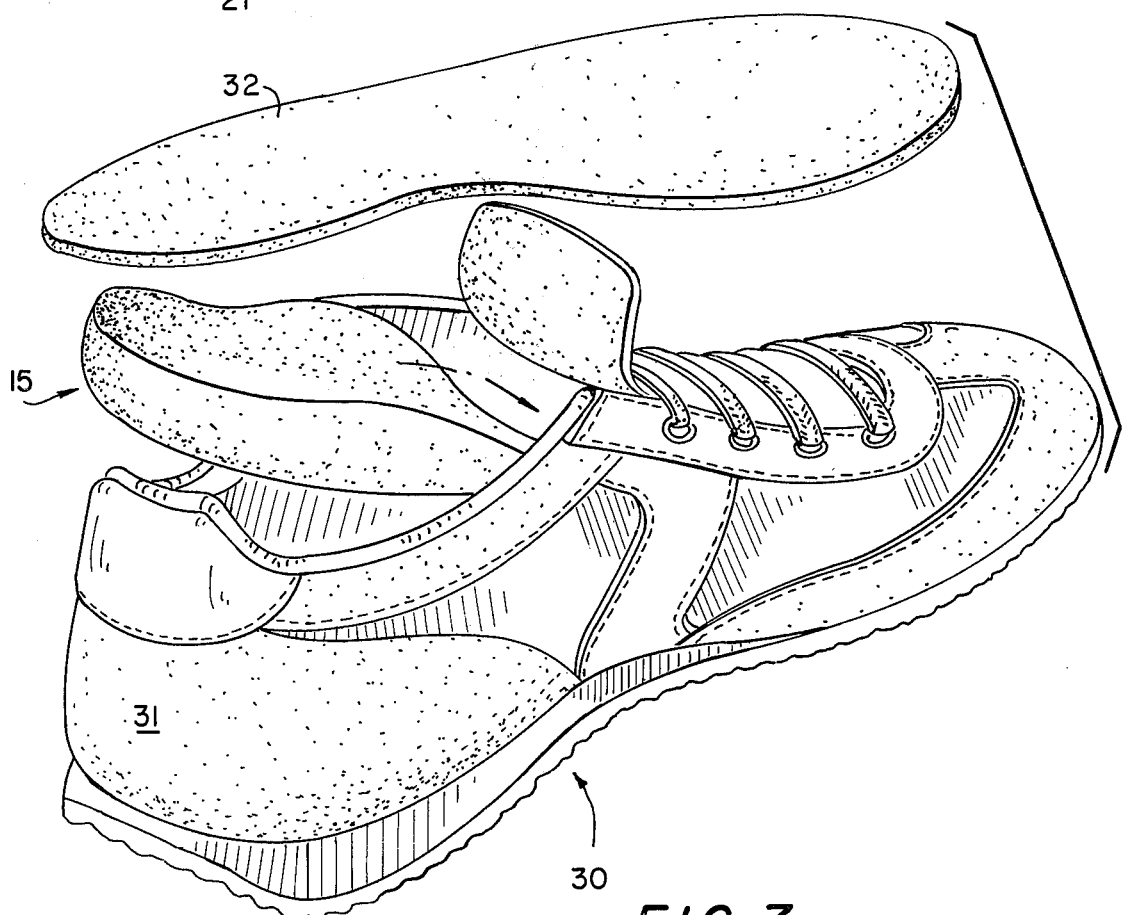

CUSHION PAD FOR SPORT SHOES AND THE LIKE AND METHOD FOR FABRICATING SAME

This is a continuation of application Ser. No. 861,153, filed Dec. 16, 1977, now abandoned.

BACKGROUND OF THE INVENTION

It will be appreciated that much of the population, both male and female, have taken up the laudable sport of running or jogging all in the name of acquiring aerobic exercise. Unfortunately, most runners do not have access to what is known as a cinder track which has the ability to soften or cushion considerably the impact of a runner. Hard surfaces as are normally found for use by runners are extremely injurious to the heels of runners unless proper precautions are taken to cushion the impact of the runner's foot on the running surface.

The need for a properly cushioned athletic shoe is even more important with regard to racing shoes which may be only two-thirds the weight of a long distance running shoe or a training shoe. (Long distance is usually defined as being greater than one mile). Consequently, with a racing shoe greater provision must be made to provide good cushioning propertie to the heel; i.e., especially to the calcaneus. It has been discovered that if the calcaneus is not properly cushioned, a jarring effect can be transferred through the ankle and up the leg to the spine, extending as far as the neck portion of the spine. Long periods of such mistreatment of the calcaneus might result in the formation of bone spurs thereon and other bones associated therewith.

Fortunately, the calcaneus ordinarily has a considerable layer of fat around the outwardly facing portion which provides some useful padding or cushioning. However, there is a tendency for some of the fat to be dissipated when it is abused by overuse. In such a situation, prior art concepts include an attempt to cup the fat and to urge it towards the center portion of the bottom of the calcaneus to emphasize its thickness where it is needed. In some instances this has been accomplished by using a plastic cup-like insert to, in effect, narrow the counter of the shoe to push the fat as heretofore noted. (The counter is, of course, a form-conferring stiffener for the heel portion of the shoe.)

In special circumstances it is often necessary to enlist the aid of a podiatrist who may prescribe an orthotic of post-formable material. Such a device may be constructed of a closed cell polyethylene foam having thermoforming or compression molding properties. The podiatrist conforms the top surface of the device to the foot by pressure and heat. The bottom of the device is laboriously formed to the shoe by employing a grinding wheel. Hard orthotics are also known which are designed for other purposes.

In any event a useful cushion pad device should also provide arch support extending from just in back of the first metatarsal joint to the back of the calcaneus. Normal arch support arrangements in shoes have been discovered to be of minimal value in this regard.

SUMMARY OF THE INVENTION

The present invention provides a cushion pad for a sport shoe and a method for fabricating such a pad. The pad of the present invention provides calcaneus support and relief from jarring.

The device of the present invention is molded from a foamed sheet of ethyl vinyl acetate-polyethylene copolymer closed cell pore material. In molding, only four sizes need be formed for the entire range of men's and women's sizes. Once suitable molded and cut the device is inserted in a shoe under the scok liner.

In use, a flat web or sheet of the aforementioned foamed material is placed between the working or molding surfaces of male and female complementary molds. The molds may be supplied with suitable heating and pressurizing means, or compression molding techniques may be employed without heat, to deform the web and cause it to assume the desired proportions and configuration of the device of the present invention. It has been found efficacious to mold a plurality of the devices of the present invention at one time from a single relatively large web of material. Subsequently, after cooling, the shapes imparted are maintained; each of the pads of the present invention are cut out of the remaining portion either manually as with a pair of scissors or by a suitable and conventional die cutting device.

BRIEF DESCRIPTION OF THE DRAWINGS

FIG. 5 is a cross-section taken along line 5—5 of FIG. 4.

FIG. 6 is a cross-section taken along line 6—6 of FIG. 4.

FIG. 7 is an exploded perspective view showing the relating position of the cushion pad of the present invention.

DETAILED DESCRIPTION OF THE INVENTION

Figure 1:
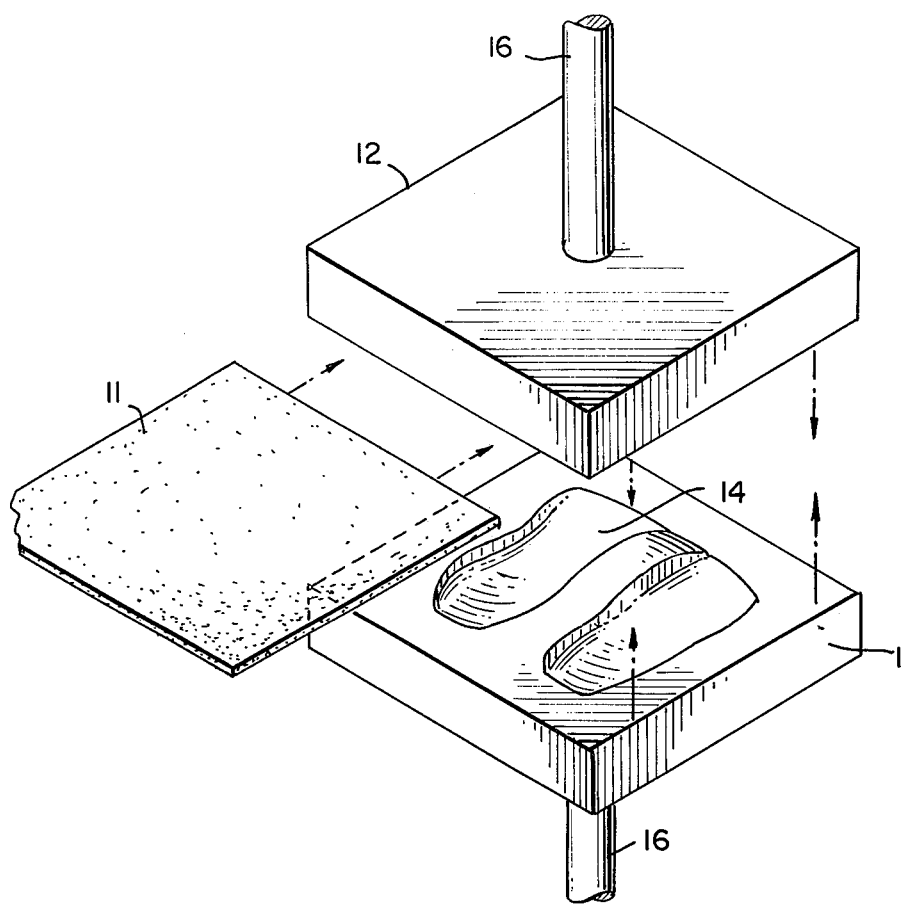
FIG. 1 is a perspective view of upper and lower molds ready for acceptance of a to-be-deformed sheet material.
Figure 2:
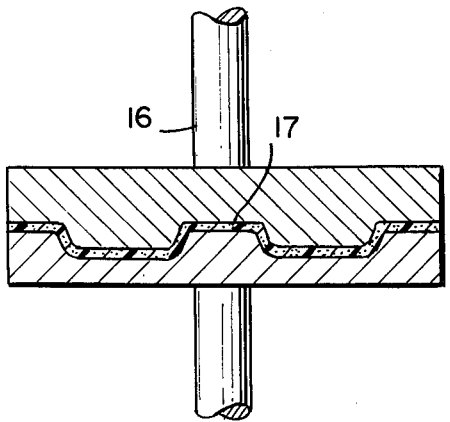
FIG. 2 is a cross-sectional view of the two molds of FIG. 1 with a deformed sheet material therebetween.

Attention is invited to FIG. 1 from which it will be discerned that a sheet or web of material 11 of 5 mm in thickness is about to be positioned between opposed separated compression molds. The upper mold 12 is a male mold while the lower mold 13 is a female mold. The two molds together define cavities 14 for establishing the unique configuration of the cushion or pad 15 of the present invention; see FIG. 4.

Before proceeding with this detailed description, a word must be stated with regard to the material of which the cushion or pad of the present invention is constructed. While numerous materials may in fact be utilizable, it has been found to be most propitious to employ a sheet of closed cell, foamed cross-linked ethylene vinyl acetate-low density polyethylene copolymer having a density of 45–55 kg/m$^3$. It is contemplated that the material have a thickness of between about 3 mm to 10 mm with 5 mm being the preferred embodiment. A suitable material is sold by United Foam Plastics Corporation under the trademark of EVAZOTE.

When the web material 11 has been suitably positioned, the molds are brought together by respective driven rod means 16, shown schematically. Turning to FIG. 12, it will be noted that the web has now been suitably deformed to produce at least a pair of deformed units 17. These units in this embodiment are depicted for a right shoe and a left shoe. It should be appreciated that the units may be produced in pairs or may all be for either the right shoe or conversely all for the left shoe. In such a situation differing molds are contemplated so that a sufficient number of each may be fabricated. Likewise, the number of units may be increased to any desirable number that may be accommodated successfully by the mold. Additionally, the size configuration will also have to differ from embodiment to embodiment so that at least four sizes may be molded which will extend over the entire range of sizes necessary for both women's and men's normal shoe sizes.

Figure 3:
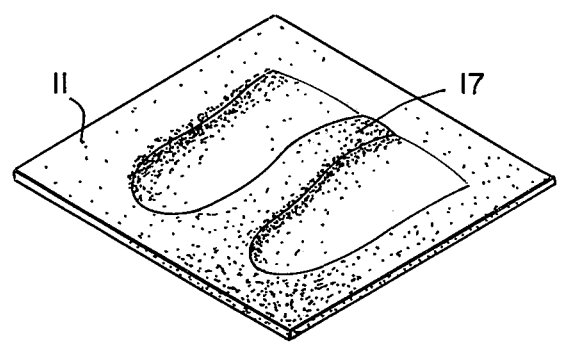
FIG. 3 is a perspective view of the deformed sheet material.

FIG. 3 shows the web 11 after it has been ejected from the mold with the units 17 still together ready for cutting. The flat non-deformed portion is carefully trimmed away from the units 17, thereby not only separating them but also producing the pad 15 of the present invention. The pad 15 shown in FIG. 4 is for a left shoe.

Figure 4:
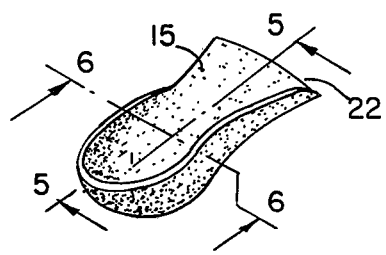
FIG. 4 is a cushion pad of the present invention.

For a consideration of the pad 15, attention is invited to FIGS. 4, 5 and 6. The pad 15 has a bottom portion 21. Along the right side of the pad there is an upwardly projecting arch support portion 20. The forward leading edge 22 of the pad terminates in a relatively smooth inclined edge that is comfortable under the instep of the wearer. The left or outer side of the pad, opposite to the arch support 20, has a relatively low forward side portion 23. Rearwardly from the highest point of the arch support portion 20, the edge of the pad phases downwardly in height to produce a lower arcuate wall 24 which extends all the way rearwardly and on around the heel and then diminishes in vertical height to merge with the aforementioned relatively low forward side portion 23.

The pad of the present invention may be readily installed in a shoe for use. Accordingly, attention is invited to FIG. 7, in which an athletic track shoe 30 for the left foot is depicted. For the purpose of clarity, the pad of the present invention is shown only partially inserted into the shoe. The pad is adjusted once it is in the rearward portion of the shoe so that it lies snugly against the counter area 31 of the shoe, and is glued into position. To provide even further enhanced comfort, FIG. 7 also illustrates a sock liner 32 which is inserted into the shoe and glued therein to sandwich the pad of the present invention between the liner and the inside of the shoe.

What is claimed is:

1. A cushion pad for shoes consisting essentially of a molded elastomeric compressible sheet of closed cell foam material adapted to support the calcaneus and the arch of a user's foot and having heel and arch portions of configuration conforming to the arch and heel portions of the foot being supported, said molded sheet having a forwardly extending leading edge for disposition in back of the first metatarsal joint when said cushion pad is in place in a shoe; said molded sheet having an inside edge portion which forms an upstanding arch support inside side wall extending from said leading edge; said molded sheet having an upstanding substantially vertical wall portion extending from said arch support side wall arcuately around the heel portion to an outer side thereof, said vertical wall gradually diminishing in height to merge with an outside edge portion of the molded sheet at a substantial distance from said beginning leading edge, said arch support side wall having a relatively higher vertical dimension than said upstanding substantially vertical wall portion extending from said arch support.

2. The cushion pad of claim 1 wherein the closed cell foam material is a cross-linked ethylene vinyl acetate-low density polyethylene copolymer.

3. The cushion pad of claim 2 wherein the material is between about 3 mm to 10 mm in thickness.

4. The cushion pad of claim 3 wherein the material is about 5 mm in thickness.

5. The cushion pad of claim 2 wherein the foam material has a density of 45.55 kg/m$^3$.

6. The cushion pad of claim 1 wherein the upstanding substantially vertical wall portion extending from said arch support side wall arcuately around the heel portion possesses an upwardly facing leading edge that is substantially in a horizontal plane.

7. A cushioning means for shoes comprising a molded elastomeric compressible sheet of closed cell foam material adapted to support the calcaneous and the arch of a user's foot and having heel and arch portions of configuration conforming to the arch and heel portions of the foot being supported, said molded sheet having a forwardly extending leading edge for disposition in back of the first metatarsal joint when said cushion pad is in place in a shoe; said molded sheet having an inside edge portion which forms an upstanding arch support inside side wall extending from said leading edge; said molded sheet having an upstanding substantially vertical wall portion extending from said arch support side wall arcuately around the heel portion to an outer side thereof, said vertical wall gradually diminishing in height to merge with an outside edge portion of the molded sheet at a substantial distance from said beginning leading edge, said arch support side wall having a relatively higher vertical dimension that said upstanding substantially vertical wall portion extending from said arch support, and a planar elongated resilient web fixedly positioned internally of said molded sheet and extending forwardly therefrom substantially beyond said leading edge of said molded sheet.

8. The molded sheet of claim 7 wherein the closed cell foam material is a cross-linked ethylene vinyl acetate-low density polyethylene copolymer.

9. The molded sheet of claim 8 wherein the material is about 3 mm to 10 mm in thickness.

10. The molded sheet of claim 9 wherein the material is about 5 mm in thickness.

11. The molded sheet of claim 8 wherein the foam material has a density of 45.55 kg/m$^3$.

12. The molded sheet of claim 7 wherein the upstanding substantially vertical wall portion extending from said arch support side wall arcuately around the heel portion possesses an upwardly facing leading edge that is substantially in a horizontal plane.

13. In combination, a shoe having cushioning means therein comprising a molded elastomeric compressible sheet of closed cell foam material adapted to support the calcaneus and the arch of a user's foot and having heel and arch portions of configuration conforming to the arch and heel portions of the foot being supported, said molded sheet having a forwardly extending leading edge for disposition in back of the first metatarsal joint when said cushion pad is in place in a shoe; said molded sheet having an inside edge portion which forms an upstanding arch support inside side wall extending from said leading edge; said molded sheet having an upstanding substantially vertical wall portion extending from said arch support side wall arcuately around the heel portion to an outer side thereof, said vertical wall gradually diminishing in height to merge with an outside edge portion of the molded sheet at a substantial distance from said beginning leading edge, said arch support side wall having a relatively higher vertical dimension than said upstanding substantially vertical wall portion extending from said arch support, and a planar elongated resilient web fixedly positioned internally of said molded sheet and extending forwardly therefrom substantially beyond said leading edge of said molded sheet.

14. The molded sheet of claim 13 wherein the closed cell foam material is a cross-linked ethylene vinyl acetate-low density polyethylene copolymer.

15. The cushion pad of claim 14 wherein the material is between about 3 mm to 10 mm in thickness.

16. The molded sheet of claim 15 wherein the material is about 5 mm in thickness.

17. The molded sheet of claim 14 wherein the foam material has a density of 45.55 kg/m$^3$.

18. The molded sheet of claim 13 wherein the upstanding substantially vertical wall portion extending from said arch support side wall arcuately around the heel portion possesses an upwardly facing leading edge that is substantially in a horizontal plane.

* * * * *